United States Patent
Harada et al.

(10) Patent No.: US 11,454,007 B2
(45) Date of Patent: Sep. 27, 2022

(54) CONTROL SYSTEM FOR WORK VEHICLE, METHOD, AND WORK VEHICLE

(71) Applicant: KOMATSU LTD., Tokyo (JP)

(72) Inventors: Junji Harada, Tokyo (JP); Eiji Ishibashi, Tokyo (JP)

(73) Assignee: KOMATSU LTD., Tokyo (JP)

( * ) Notice: Subject to any disclaimer, the term of this patent is extended or adjusted under 35 U.S.C. 154(b) by 433 days.

(21) Appl. No.: 16/644,520

(22) PCT Filed: Feb. 18, 2019

(86) PCT No.: PCT/JP2019/005832
§ 371 (c)(1),
(2) Date: Mar. 5, 2020

(87) PCT Pub. No.: WO2019/187770
PCT Pub. Date: Oct. 3, 2019

(65) Prior Publication Data
US 2020/0283996 A1    Sep. 10, 2020

(30) Foreign Application Priority Data

Mar. 28, 2018   (JP) ............... JP2018-062237

(51) Int. Cl.
*E02F 9/26* (2006.01)
*E02F 3/76* (2006.01)
*E02F 9/20* (2006.01)

(52) U.S. Cl.
CPC ............ *E02F 9/262* (2013.01); *E02F 3/7613* (2013.01); *E02F 9/205* (2013.01); *E02F 9/2041* (2013.01)

(58) Field of Classification Search
CPC ......... E02F 9/262; E02F 9/2041; E02F 9/205; E02F 3/7613; E02F 3/76; E02F 3/842;
(Continued)

(56) References Cited

U.S. PATENT DOCUMENTS 9,228,315 B2 *   1/2016   Edara ................. G05D 1/00
9,487,929 B2 *  11/2016   Wei .................... E02F 3/841
(Continued)

FOREIGN PATENT DOCUMENTS

CN    107109818 A    8/2017
CN    108779625 A   11/2018
(Continued)

OTHER PUBLICATIONS

The Office Action for the corresponding Chinese application No. 201980004556.9, dated Jan. 28, 2021.
(Continued)

*Primary Examiner* — Russell Frejd
(74) *Attorney, Agent, or Firm* — Global IP Counselors, LLP

(57) ABSTRACT

A work vehicle includes a work implement. A control system for the work vehicle includes a controller. The controller obtains actual topography data indicative of an actual topography of a work site. The controller determines a target depth. The controller obtains positions of a plurality of division points positioned on the actual topography based on the actual topography data. The controller determines a plurality of reference points by displacing the plurality of division points in a vertical direction by the target depth. The controller determines a target design topography based on the plurality of reference points. The controller generates a command signal to operate the work implement in accordance with the target design topography.

15 Claims, 15 Drawing Sheets

(58) Field of Classification Search
CPC ........ E02F 3/845; E02F 3/847; G05D 1/0274;
G05D 2201/0202
See application file for complete search history.

(56) References Cited

U.S. PATENT DOCUMENTS

| | | | |
|---|---|---|---|
| 10,584,463 | B2 | 3/2020 | Matsuyama et al. |
| 2008/0127530 | A1 | 6/2008 | Kelly |
| 2013/0081831 | A1 | 4/2013 | Hayashi |
| 2013/0311031 | A1 | 11/2013 | Friend et al. |
| 2016/0076223 | A1 | 3/2016 | Wei et al. |
| 2018/0038067 | A1 | 2/2018 | Hashimoto et al. |
| 2018/0038082 | A1 | 2/2018 | Hashimoto et al. |
| 2019/0078297 | A1* | 3/2019 | Ishibashi .............. G05D 1/0246 |
| 2019/0093315 | A1* | 3/2019 | Ishibashi ................ E02F 9/2045 |
| 2020/0291615 | A1* | 9/2020 | Ishibashi ................. E02F 3/844 |
| 2021/0079629 | A1* | 3/2021 | Hashimoto ........... E02F 3/7609 |
| 2021/0132617 | A1 | 5/2021 | Harada et al. |
| 2021/0285186 | A1* | 9/2021 | Ishibashi ................. E02F 3/841 |

FOREIGN PATENT DOCUMENTS

| | | |
|---|---|---|
| CN | 110168173 A | 8/2019 |
| JP | 5247939 B1 | 7/2013 |
| JP | 2017-227014 A | 12/2017 |
| JP | 2018-21348 A | 2/2018 |

OTHER PUBLICATIONS

The International Search Report for the corresponding international application No. PCT/JP2019/005832, dated May 7, 2019.
The Office Action for the corresponding Chinese application No. 201980004556.9, dated May 10, 2021.

* cited by examiner

CONTROL SYSTEM FOR WORK VEHICLE, METHOD, AND WORK VEHICLE

CROSS-REFERENCE TO RELATED APPLICATIONS

This application is a U.S. National stage application of International Application No. PCT/JP2019/005832, filed on Feb. 18, 2019. This U.S. National stage application claims priority under 35 U.S.C. § 119(a) to Japanese Patent Application No. 2018-062237, filed in Japan on Mar. 28, 2018, the entire contents of which are hereby incorporated herein by reference.

BACKGROUND

Field of the Invention

The present invention relates to a control system for a work vehicle, a method, and a work vehicle.

Background Information

A control for automatically adjusting the position of a work implement such as a blade has been conventionally proposed for work vehicles such as bulldozers or graders and the like. For example, Japanese Patent Publication No. 5247939 describes automatically adjusting a blade by controlling the load so that the load applied to the blade matches a target load during excavating work.

SUMMARY

According to the abovementioned conventional control, the occurrence of shoe slip can be suppressed by raising the blade when the load on the blade becomes excessive. As a result, work can be performed with good efficiency.

However, as illustrated in FIG. 15, in the conventional control, first the blade is controlled so as to follow a design topography 100. Thereafter, when the load on the blade becomes large, the blade is raised due to the load control (see the locus 200 of the blade in FIG. 15). Therefore, when the blade is in a position deep in the design topography 100 with respect to the actual topography 300, the load applied to the blade increases very quickly whereby the blade may be raised very quickly. In this case, because the terrain is formed with large undulations, it may be difficult to carry out excavating work smoothly. Moreover, there is a concern that the excavated terrain may easily become rough and the quality of the finish may decrease.

An object of the present invention is to cause a work vehicle to perform work efficiently and with a good finish quality with automatic control.

A first aspect is a control system for a work vehicle including a work implement, the control system including a controller. The controller is programmed to execute the following processes. The controller obtains actual topography data indicative of an actual topography of a work site. The controller determines a target depth. The controller obtains positions of a plurality of division points positioned on the actual topography based on the actual topography data. The controller determines a plurality of reference points by displacing the plurality of division points in a vertical direction by the target depth. The controller determines a target design topography based on the plurality of reference points. The controller generates a command signal to operate the work implement in accordance with the target design topography.

A second aspect is a method executed by the controller for controlling a work vehicle including a work implement, the method including the following processes. A first process includes obtaining actual topography data indicative of an actual topography of a work site. A second process includes determining a target depth. A third process includes obtaining positions of a plurality of division points positioned on the actual topography based on the actual topography data. A fifth process includes determining a plurality of reference points by displacing the plurality of division points in a vertical direction by the target depth. A sixth process includes generating a command signal to operate the work implement in accordance with the target design topography.

A third aspect is a work vehicle, the work vehicle including a work implement and a controller for controlling the work implement. The controller is programmed to execute the following processes. The controller obtains actual topography data indicative of an actual topography of a work site. The controller determines a target depth. The controller obtains positions of a plurality of division points positioned on the actual topography based on the actual topography data. The controller determines a plurality of reference points by displacing the plurality of division points in a vertical direction by the target depth. The controller determines a target design topography based on the plurality of reference points. The controller generates a command signal to operate the work implement in accordance with the target design topography.

According to the present invention, a work vehicle can be made to perform work efficiently and with a good finish quality with automatic control.

DETAILED DESCRIPTION OF EMBODIMENT(S)

Figure 1:
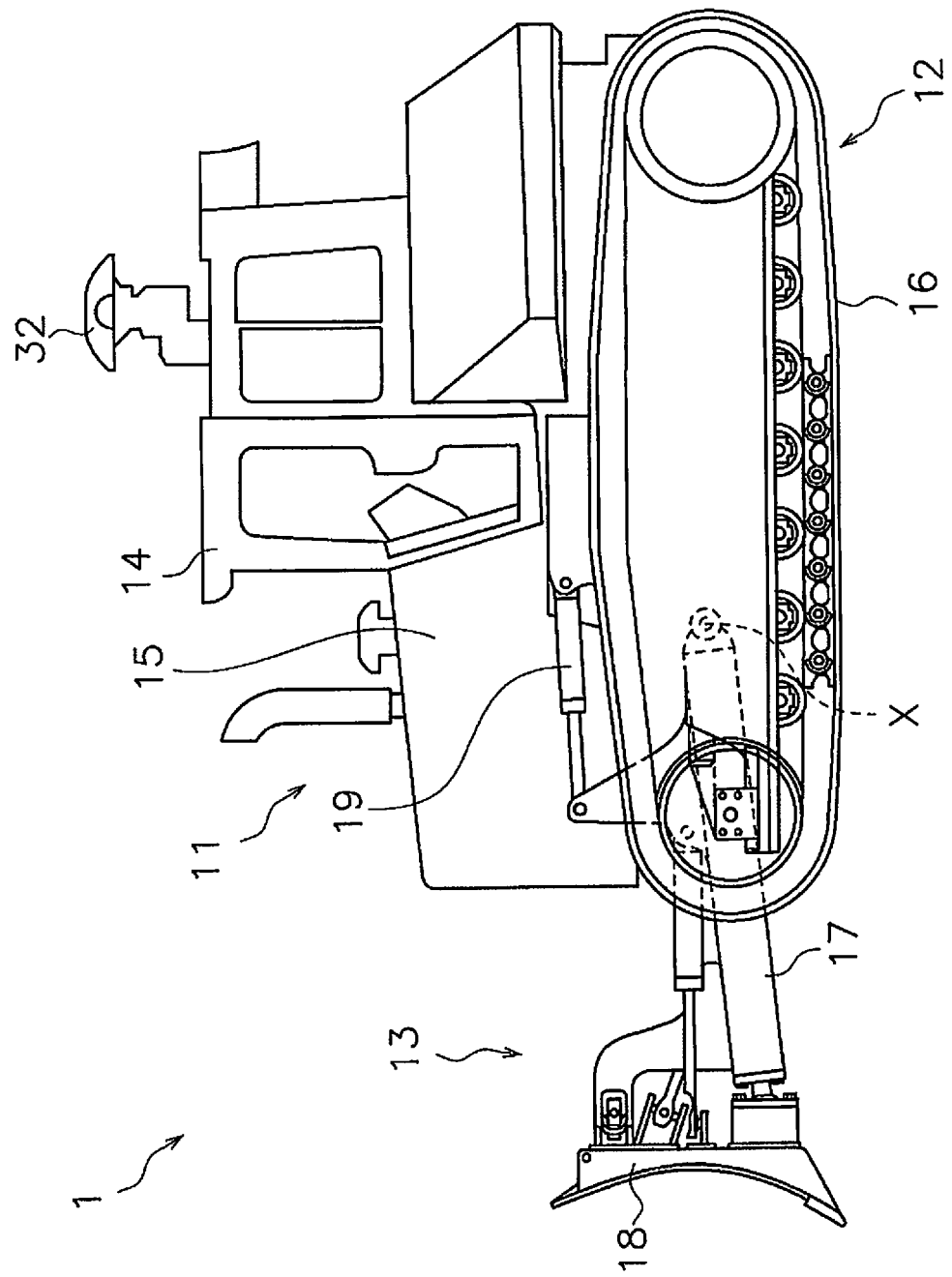
FIG. 1 is a side view of a work vehicle according to an embodiment.

A work vehicle according to an embodiment is discussed hereinbelow with reference to the drawings. FIG. 1 is a side view of a work vehicle 1 according to an embodiment. The work vehicle 1 according to the present embodiment is a bulldozer. The work vehicle 1 includes a vehicle body 11, a travel device 12, and a work implement 13.

The vehicle body 11 has an operating cabin 14 and an engine compartment 15. An operator's seat that is not illustrated is disposed inside the operating cabin 14. The engine compartment 15 is disposed in front of the operating cabin 14. The travel device 12 is attached to a bottom part of the vehicle body 11. The travel device 12 has a pair of left and right crawler belts 16. Only the crawler belt 16 on the left side is illustrated in FIG. 1. The work vehicle 1 travels due to the rotation of the crawler belts 16.

The work implement 13 is attached to the vehicle body 11. The work implement 13 has a lift frame 17, a blade 18, and a lift cylinder 19. The lift frame 17 is attached to the vehicle body 11 in a manner that allows movement up and down centered on an axis X that extends in the vehicle width direction. The lift frame 17 supports the blade 18.

The blade 18 is disposed in front of the vehicle body 11. The blade 18 moves up and down accompanying the up and down motion of the lift frame 17. The lift frame 17 may be attached to the travel device 12. The lift cylinder 19 is coupled to the vehicle body 11 and the lift frame 17. Due to the extension and contraction of the lift cylinder 19, the lift frame 17 rotates up and down centered on the axis X.

Figure 2:
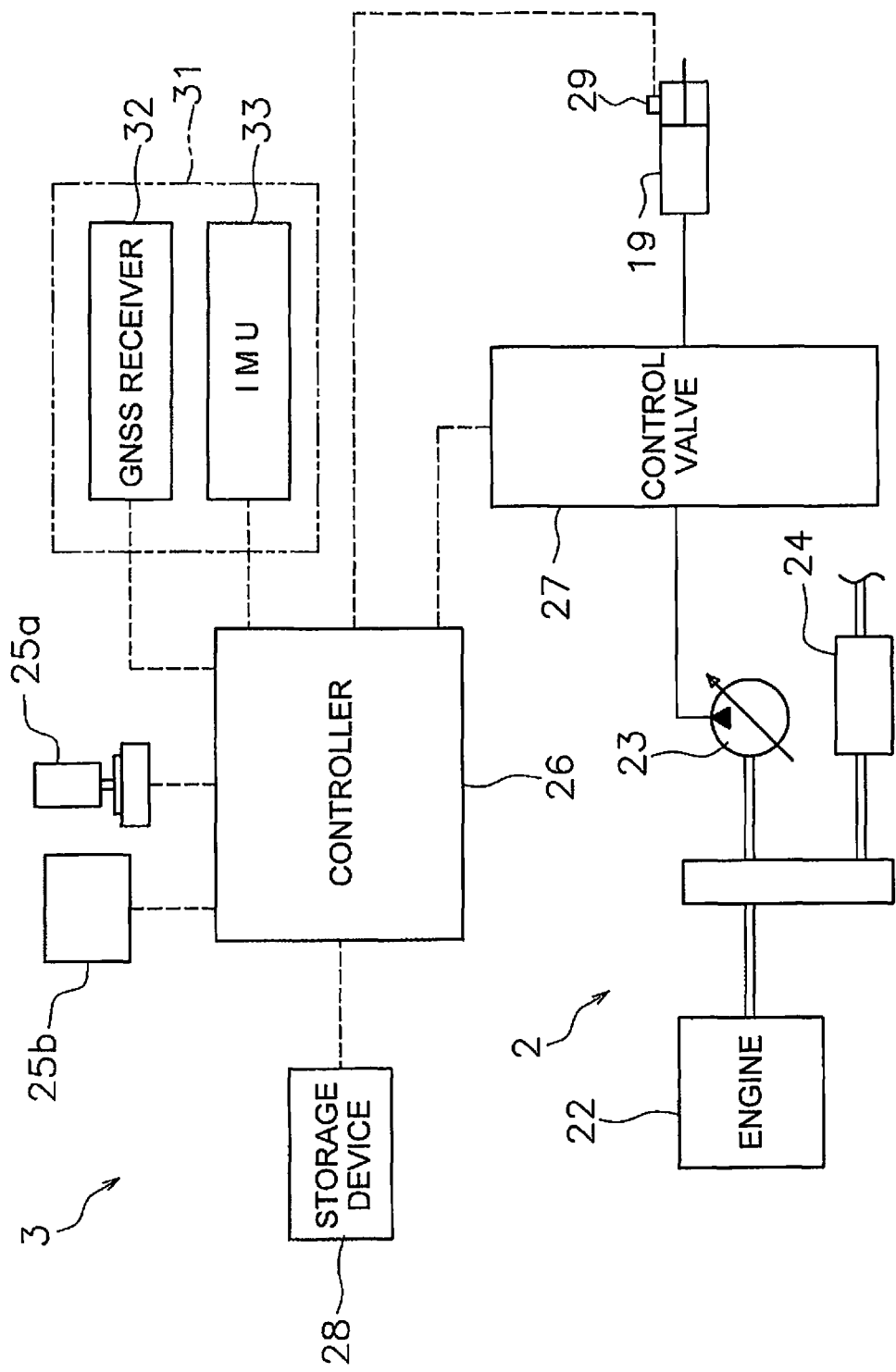
FIG. 2 is a block diagram of a configuration of a drive system and a control system of the work vehicle.

FIG. 2 is a block diagram of a configuration of a drive system 2 and a control system 3 of the work vehicle 1. As illustrated in FIG. 2, the drive system 2 includes an engine 22, a hydraulic pump 23, and a power transmission device 24.

The hydraulic pump 23 is driven by the engine 22 to discharge hydraulic fluid. The hydraulic fluid discharged from the hydraulic pump 23 is supplied to the lift cylinder 19. While only one hydraulic pump 23 is illustrated in FIG. 2, a plurality of hydraulic pumps may be provided.

The power transmission device 24 transmits driving power from the engine 22 to the travel device 12. The power transmission device 24 may be a hydrostatic transmission (HST), for example. Alternatively, the power transmission device 24, for example, may be a transmission including a torque converter or a plurality of speed change gears.

The control system 3 includes an operating device 25a, an input device 25b, a controller 26, a storage device 28, and a control valve 27. The operating device 25a and the input device 25b are disposed in the operating cabin 14. The operating device 25a is a device for operating the work implement 13 and the travel device 12. The operating device 25a is disposed in the operating cabin 14. The operating device 25a receives operations from an operator for driving the work implement 13 and the travel device 12, and outputs operation signals in accordance with the operations. The operating device 25a includes, for example, an operating lever, a pedal, and a switch and the like.

The input device 25b is a device for performing below mentioned automatic control settings of the work vehicle 1. The input device 25b receives an operation by an operator and outputs an operation signal corresponding to the operation. The operation signals of the input device 25b are output to the controller 26. The input device 25b is, for example, a touch screen display. However, the input device 25b is not limited to a touch screen and may include hardware keys.

The controller 26 is programmed so as to control the work vehicle 1 based on obtained data. The controller 26 includes, for example, a processing device (processor) such as a CPU. The controller 26 obtains operation signals from the operating device 25a and the input device 25b. The controller 26 is not limited to one component and may be divided into a plurality of controllers. The controller 26 controls the travel device 12 or the power transmission device 24 thereby causing the work vehicle 1 to travel. The controller 26 controls the control valve 27 thereby causing the blade 18 to move up and down.

The control valve 27 is a proportional control valve and is controlled with command signals from the controller 26. The control valve 27 is disposed between the hydraulic pump 23 and hydraulic actuators such as the lift cylinder 19. The control valve 27 controls the flow rate of the hydraulic fluid supplied from the hydraulic pump 23 to the lift cylinder 19. The controller 26 generates a command signal to the control valve 27 so that the blade 18 moves. As a result, the lift cylinder 19 is controlled. The control valve 27 may also be a pressure proportional control valve. Alternatively, the control valve 27 may be an electromagnetic proportional control valve.

Figure 3:
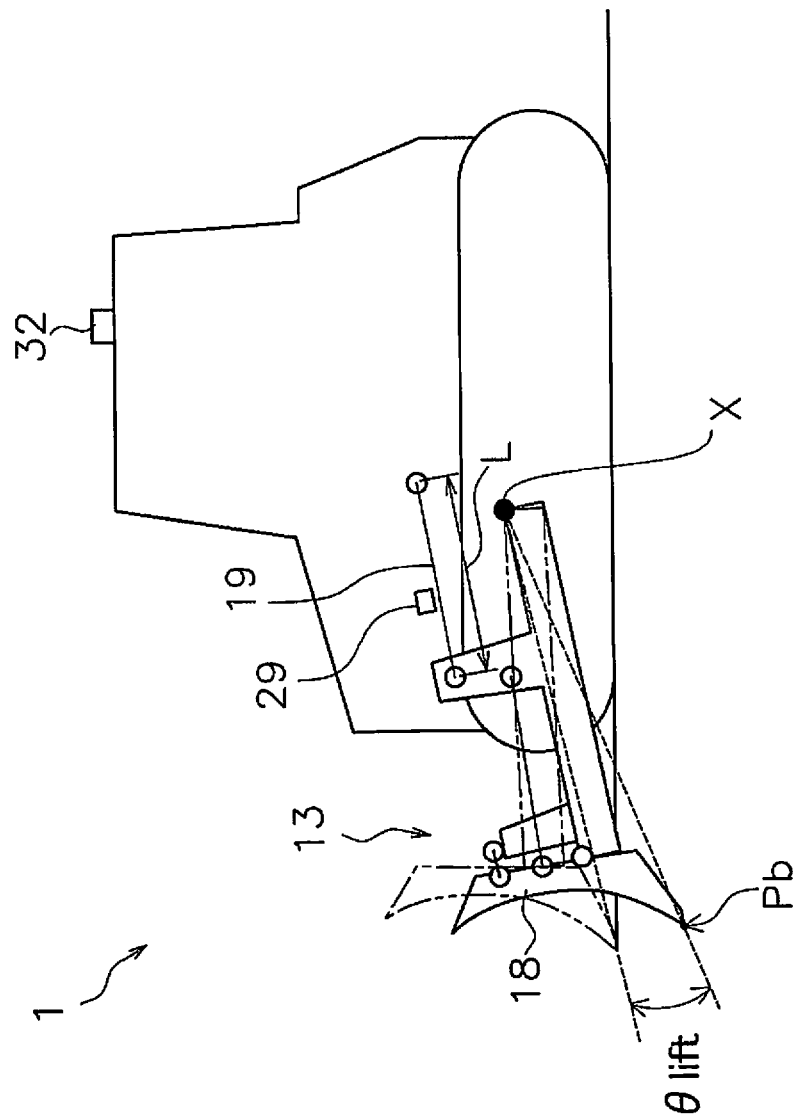
FIG. 3 is a schematic view of a configuration of the work vehicle.

The control system 3 includes a work implement sensor 29. The work implement sensor 29 detects the position of the work implement 13 and outputs a work implement position signal which indicates the position of the work implement 13. The work implement sensor 29 may be a displacement sensor that detects displacement of the work implement 13. Specifically, the work implement sensor 29 detects the stroke length (referred to below as "lift cylinder length L") of the lift cylinder 19. As illustrated in FIG. 3, the controller 26 calculates a lift angle θlift of the blade 18 based on the lift cylinder length L. The work implement sensor 29 may be a rotation sensor that directly detects the rotation angle of the work implement 13.

FIG. 3 is a schematic view of a configuration of the work vehicle 1. The reference position of the work implement 13 is depicted as a chain double-dashed line in FIG. 3. The reference position of the work implement 13 is the position of the blade 18 while the blade tip of the blade 18 is in contact with the ground surface on a horizontal ground surface. The lift angle θlift is the angle from the reference position of the work implement 13.

As illustrated in FIG. 2, the control system 3 includes a positional sensor 31. The positional sensor 31 measures the position of the work vehicle 1. The positional sensor 31 includes a global navigation satellite system (GNSS) receiver 32 and an IMU 33. The GNSS receiver 32 is, for example, a receiving apparatus for a global positioning system (GPS). For example, an antenna of the GNSS receiver 32 is disposed on the operating cabin 14. The GNSS receiver 32 receives a positioning signal from a satellite, computes the position of the antenna from the positioning signal, and generates vehicle body position data. The controller 26 obtains the vehicle body position data from the GNSS receiver 32. The controller 26 derives the traveling direction and the vehicle speed of the work vehicle 1 from the vehicle body position data.

The vehicle body position data may not be data of the antenna position. The vehicle body position data may be data that indicates a position of an arbitrary position having a fixed positional relationship with an antenna inside the work vehicle 1 or in the surroundings of the work vehicle 1.

The IMU 33 is an inertial measurement device. The IMU 33 obtains vehicle body inclination angle data. The vehicle body inclination angle data includes the angle (pitch angle) relative to horizontal in the vehicle front-back direction and the angle (roll angle) relative to horizontal in the vehicle lateral direction. The controller 26 obtains the vehicle body inclination angle data from the IMU 33.

The controller 26 computes a blade tip position Pb from the lift cylinder length L, the vehicle body position data, and the vehicle body inclination angle data. As illustrated in FIG. 3, the controller 26 calculates global coordinates of the GNSS receiver 32 based on the vehicle body position data. The controller 26 calculates the lift angle θlift based on the lift cylinder length L. The controller 26 calculates local coordinates of the blade tip position Pb with respect to the GNSS receiver 32 based on the lift angle θlift and vehicle body dimension data. The vehicle body dimension data is stored in the storage device 28 and indicates the position of the work implement 13 with respect to the GNSS receiver 32. The controller 26 calculates the global coordinates of the blade tip position Pb based on the global coordinates of the GNSS receiver 32, the local coordinates of the blade tip position Pb, and the vehicle body inclination angle data. The controller 26 obtains the global coordinates of the blade tip position Pb as blade tip position data.

The storage device 28 includes, for example, a memory and an auxiliary storage device. The storage device 28 may be a RAM or a ROM, for example. The storage device 28 may be a semiconductor memory or a hard disk and the like. The storage device 28 is an example of a non-transitory computer-readable recording medium. The storage device 28 records computer commands for controlling the work vehicle 1 and that are executable by the processor.

The storage device 28 stores design topography data and work site topography data. The design topography data indicates the final design topography. The final design topography is the final target shape of the surface of a work site. The work site topography data is, for example, a civil engineering diagram map in a three-dimensional data format. The work site topography data indicates the topography of a wide area of the work site. The work site topography data is, for example, an actual topographical survey map in a three-dimensional data format. The work site topography data can be derived, for example, from an aerial laser survey.

The controller 26 obtains actual topography data. The actual topography data indicates the actual topography of the work site. The actual topography of the work site is the topography of an area in the traveling direction of the work vehicle 1. The actual topography data is obtained by computations by the controller 26 from the work site topography data, the position of the work vehicle 1 obtained by the abovementioned positional sensor 31, and from the traveling direction. The actual topography data may be obtained by performing distance surveying on the actual topography with an on-board laser imaging detection and ranging device (LIDAR).

The controller 26 automatically controls the work implement 13 based on the actual topography data, the design topography data, and the blade tip position data. The automatic control of the work implement 13 may be a semi-automatic control that is performed in accompaniment with manual operations by the operator. Alternatively, the automatic control of the work implement 13 may be a fully automatic control that is performed without manual operations by an operator. The traveling of the work vehicle 1 may be controlled automatically by the controller 26. For example, the travel control of the work vehicle 1 may be a fully automatic control that is performed without manual operations by an operator. Alternatively, the travel control may be a semi-automatic control that is performed in accompaniment with manual operations by an operator. Alternatively, the travel of the work vehicle 1 may be performed with manual operations by the operator.

Automatic control of the work vehicle 1 during excavation and executed by the controller 26 will be explained below. The controller 26 starts the automatic control when a predetermined starting condition is met. The predetermined starting condition may be, for example, that an operation signal which indicates a lowering operation of the work implement 13 is received from the operating device 25a. Alternatively, the predetermined starting condition may be that an operation signal indicating an automatic control starting command is received by the controller 26 from the input device 25b.

Figure 4:
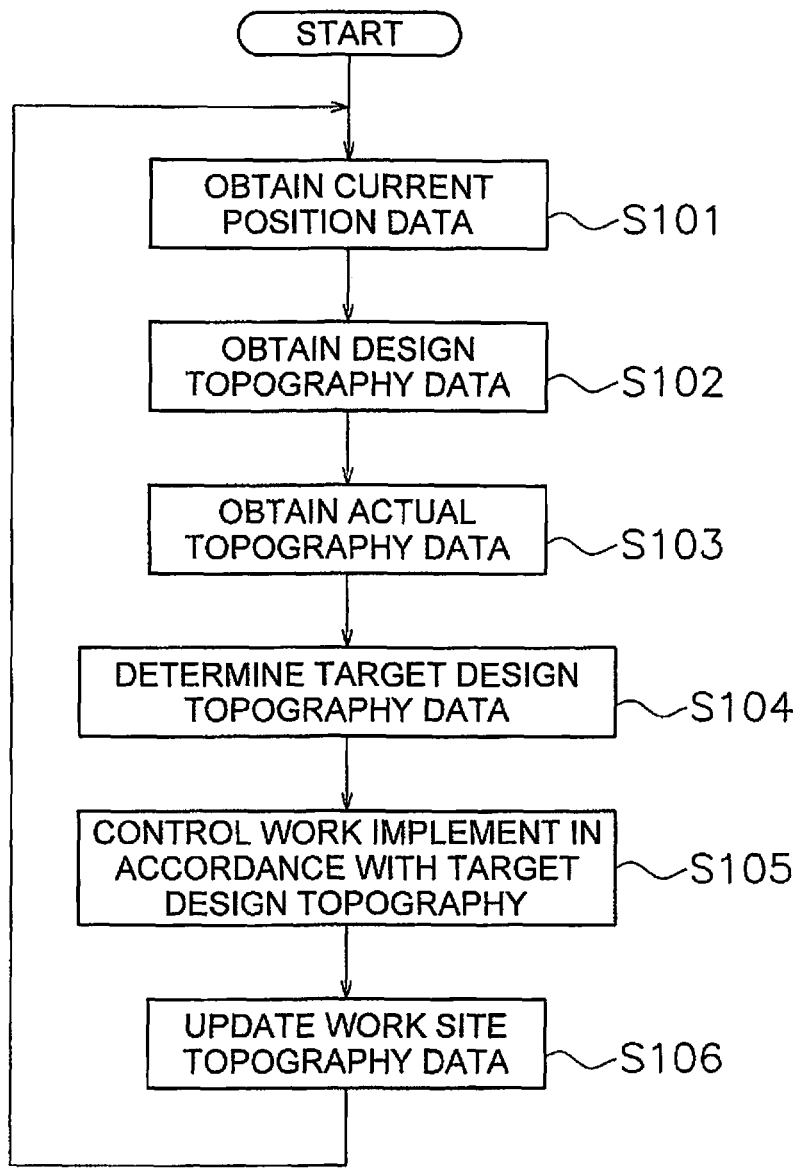
FIG. 4 is a flow chart of an automatic control process of the work vehicle.

FIG. 4 is a flow chart of automatic control processes of the work vehicle 1. As illustrated in FIG. 4, the controller 26 obtains the current position data in step S101. The controller 26 obtains the current blade tip position Pb of the work implement 13 as indicated above.

Figure 5:
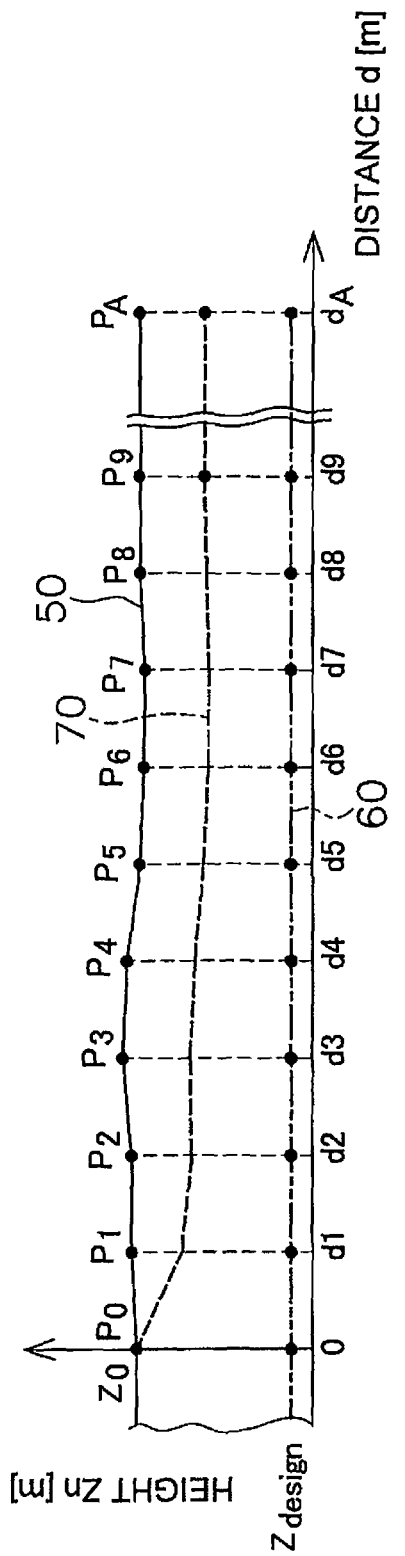
FIG. 5 illustrates examples of a final design topography, an actual topography, and a target design topography.

In step S102, the controller 31 obtains the design topography data. As illustrated in FIG. 5, the design topography data includes a height Zdesign of a final design topography 60 at a plurality of reference points Pn (n=0, 1, 2, 3, . . . , A) in the traveling direction of the work vehicle 1. The plurality of reference points Pn indicate a plurality of spots at predetermined intervals in the traveling direction of the work vehicle 1. The plurality of reference points Pn are on the travel path of the blade 18. In FIG. 5, while the final design topography 60 has a shape that is flat and parallel to the horizontal direction, the shape of the final design topography 60 may be different.

In step S103, the controller 26 obtains the actual topography data. The controller 26 obtains the actual topography data by computations of the work site topography data obtained from the storage device 28 and the vehicle body position data and the traveling direction data obtained by the positional sensor 31.

The actual topography data is information which indicates the topography located in the traveling direction of the work vehicle 1. FIG. 5 illustrates a cross-section of actual topography 50. In FIG. 5, the vertical axis indicates the height of the topography and the horizontal axis indicates the distance from the current position in the traveling direction of the work vehicle 1.

Specifically, the actual topography data includes a height Zn of the actual topography 50 at each of the plurality of reference points Pn from the current position to a predetermined topography recognition distance dA in the traveling direction of the work vehicle 1. In the present embodiment, the current position may be a position defined based on the current blade tip position Pb of the work vehicle 1. However, the current position may also be defined based on the current position of another portion of the work vehicle 1. The plurality of reference points are aligned with a predetermined interval, for example 1 m, between each point.

In step S104, the controller 26 determines the target design topography data. The target design topography data represents a target design topography 70 indicated by the dashed line in FIG. 5. The target design topography 70 represents a desired locus of the blade tip of the blade 18 during the work. The target design topography 70 is a target profile of the topography that is the work object and represents the desired shape as a result of the excavating work. As illustrated in FIG. 5, the controller 26 determines at least a portion of the target design topography 70 located below the actual topography 50.

The controller 26 determines the target design topography 70 so as not to go below the final design topography 60. Therefore, the controller 26 determines the target design topography 70 located above the final design topography 60 and below the actual topography 50 during the excavating work.

In step S105, the controller 26 controls the work implement 13 in accordance with the target design topography 70. The controller 26 generates command signals for the work implement 13 so as to move the blade tip position of the blade 18 in accordance with the target design topography 70. The generated command signal is inputted to the control valve 27. Consequently, the blade tip position PB of the blade 18 moves toward the target design topography 70.

In step S106, the controller 26 updates the work site topography data. The controller 26 updates the work site topography data with the position data that indicates the most recent locus of the blade tip position Pb. The update of the work site topography data may be performed at any time. Alternatively, the controller 26 may calculate the location of the bottom surface of the crawler belts 16 from the vehicle body position data and the vehicle body dimension data, and may update the work site topography data with the position data that indicates the locus of the bottom surface of the crawler belts 16. In this case, the updating of the work site topography data can be performed promptly.

Alternatively, the work site topography data may be generated from survey data measured by a survey device outside of the work vehicle 1. For example, aerial laser surveying may be used as the external measurement device. Alternatively, the actual topography 50 may be imaged by a camera and the work site topography data may be generated from image data captured by the camera. For example, aerial photography surveying performed with an unmanned aerial vehicle (UAV) may be used. When using the external surveying device or a camera, the updating of the work site topography data may be performed at predetermined periods or at any time.

By repeating the above processes, the excavating is performed so that the actual topography 50 approaches the final design topography 60.

Figure 6:
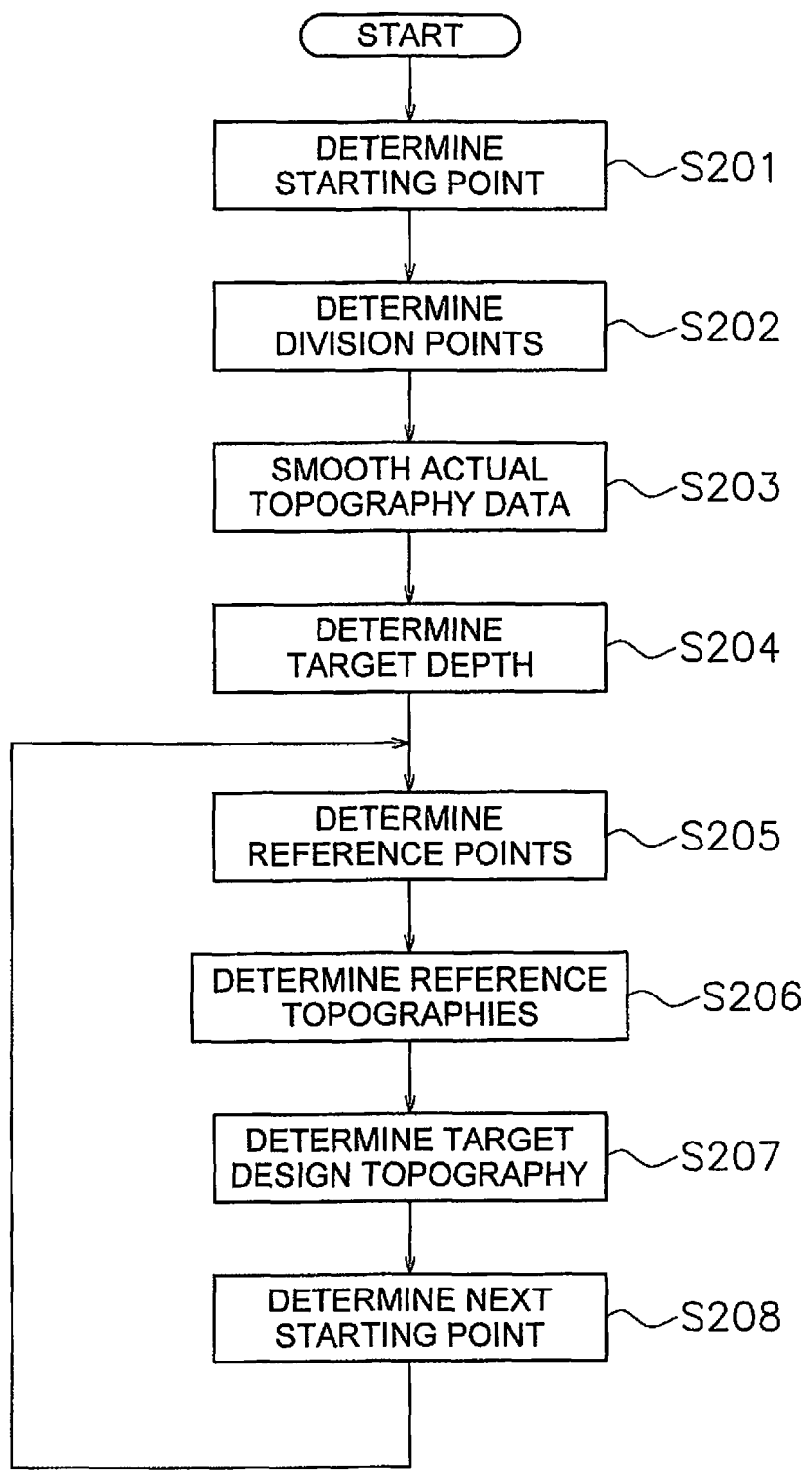
FIG. 6 is a flow chart of a process for determining the target design topography.
Figure 7:
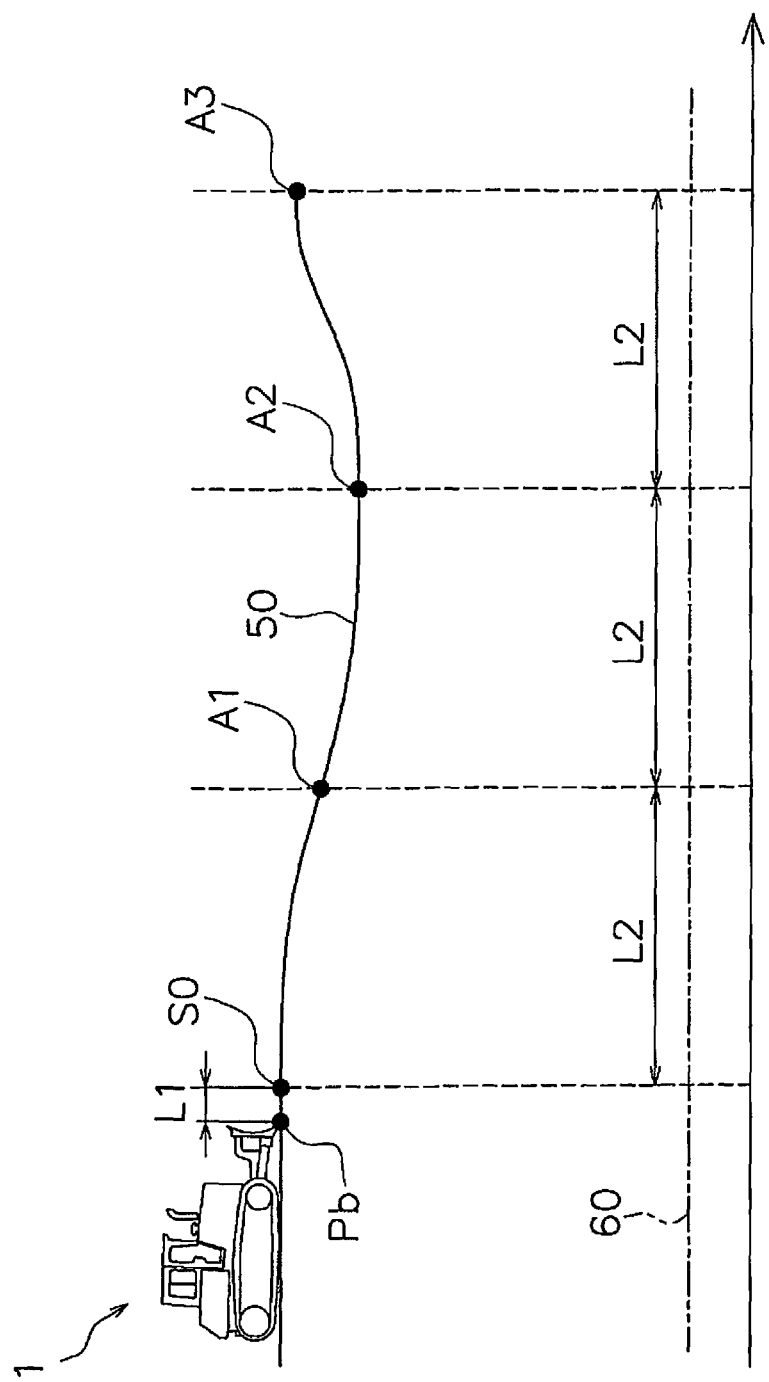
FIG. 7 illustrates a process for determining the target design topography.

The processing for determining the target design topography 70 is explained in detail below. FIG. 6 is a flow chart of a process for determining the target design topography 70. As illustrated in FIG. 6, in step S201, the controller 26 determines a starting point S0. As illustrated in FIG. 7, the controller 26 determines, as the starting point S0, a position that is a predetermined distance L1 in front of the blade tip position Pb at the point in time that the automatic control starts. The predetermined distance L1 is saved in the storage device 28. The input device 25b may be used to allow setting of the predetermined distance L1.

In step S202, the controller 26 determines a plurality of division points An (n=1, 2, . . . ) based on the actual topography data. As illustrated in FIG. 7, the controller 26 demarcates the actual topography 50 into a plurality of divisions according to the division points An. As illustrated in FIG. 7, the division points An are spots positioned away from each other by a predetermined interval L2 on the actual topography 50. The predetermined interval L2 is, for example, 3 m. However, the predetermined interval L2 may be less than 3 m or greater than 3 m. The predetermined interval L2 is saved in the storage device 28. The input device 25b may be used to allow setting of the predetermined interval L2. The controller 26 determines, as the division points An, a plurality of spots at each predetermined interval L2 in the traveling direction of the work vehicle 1 from the starting point S0.

Figure 8:
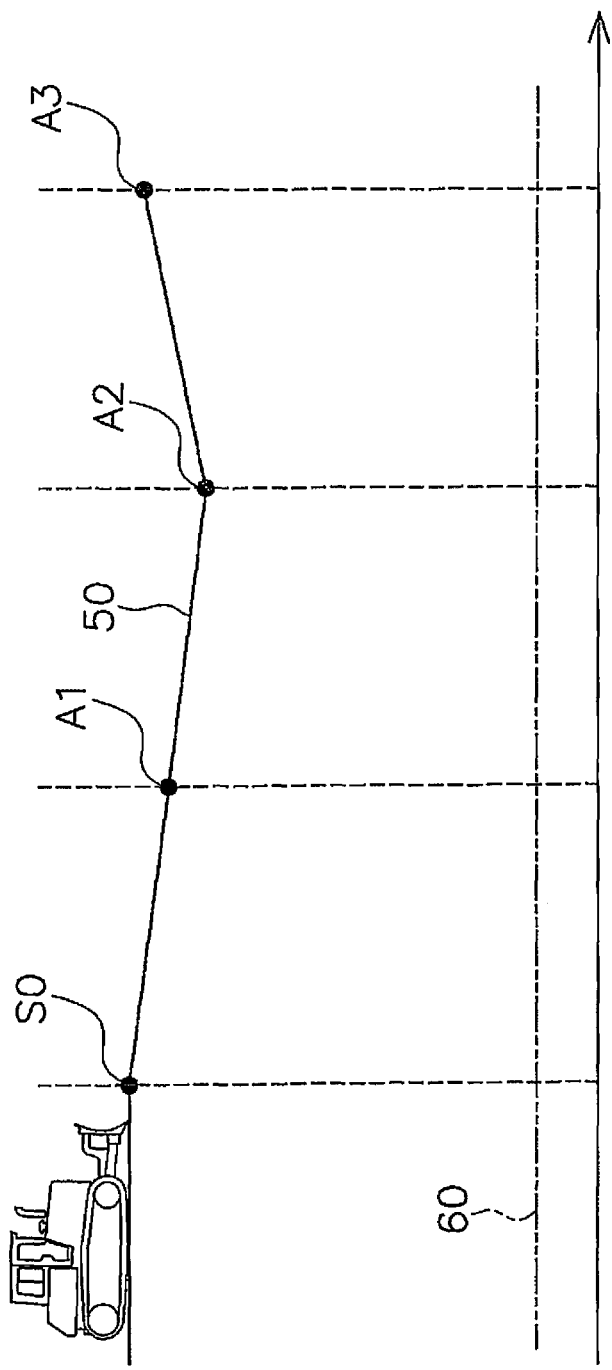
FIG. 8 illustrates a process for determining the target design topography.

In step S203, the controller 26 smooths the actual topography data. The controller 26 smooths the actual topography data by linear interpolation. Specifically, as illustrated in FIG. 8, the controller 26 smooths the actual topography data by replacing the actual topography 50 with straight lines that link each of the division points An.

In step S204, the controller 26 determines a target depth L3. The controller 26 determines the target depth L3 in accordance with a control mode set with the input device 25b. For example, the operator is able to select any of a first mode, a second mode, and a third mode with the input device 25b. The first mode is a control mode with the greatest load and the third mode is a control mode with the smallest load. The second mode is a control mode with a load between the first mode and the third mode.

The target depths L3 corresponding to each mode are saved in the storage device 28. The controller 26 selects, as the target depth L3, a first target depth of the first mode, a second target depth of the second mode, or a third target depth of the third mode. The first target depth is greater than the second target depth. The second target depth is greater than the third target depth. The input device 25b may be used to allow optional setting of the target depth L3.

Figure 9:
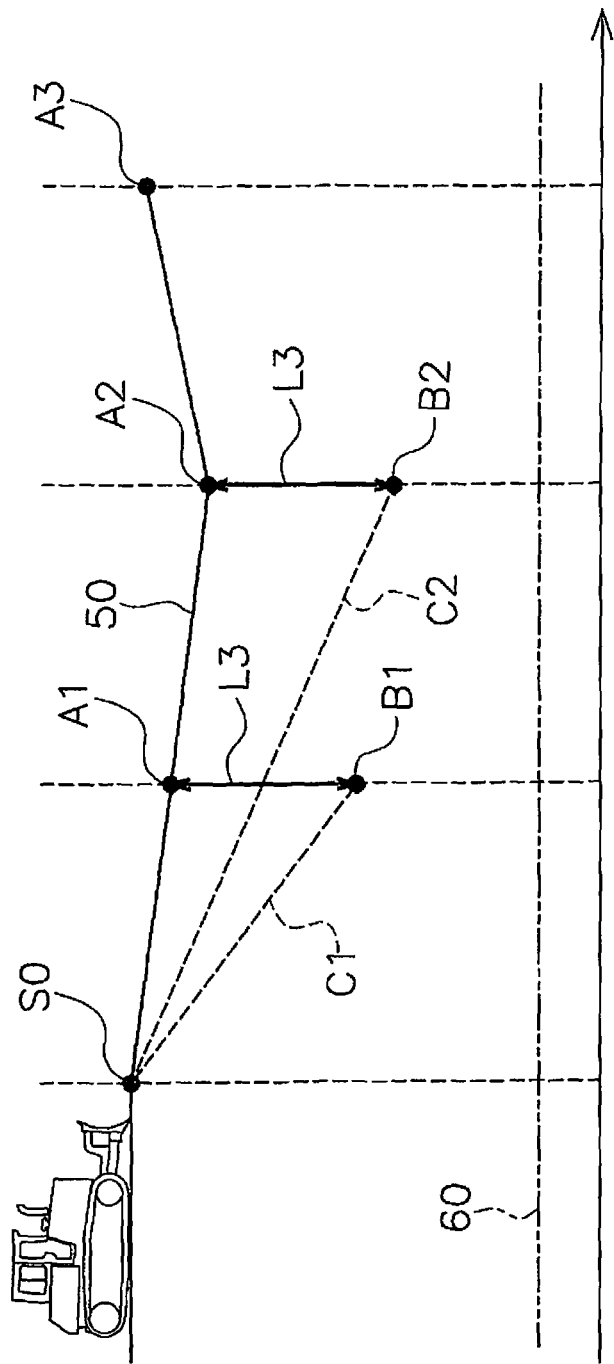
FIG. 9 illustrates a process for determining the target design topography.

In step S205, the controller 26 determines a plurality of reference points. As illustrated in FIG. 9, the controller 26 determines, as respective reference points B1 and B2, spots displaced downward by the target depth L3 from the first preceding division point A1 and from the second preceding division point A2.

In step S206, the controller 26 determines a plurality of reference topographies. As illustrated in FIG. 9, the controller 26 determines a first reference topography C1 and a second reference topography C2. The first reference topography C1 is represented by a straight line that links the starting point S0 and the first preceding reference point K. The second reference topography C2 is represented by a straight line that links the starting point S0 and the second preceding reference point B2.

Figure 10:
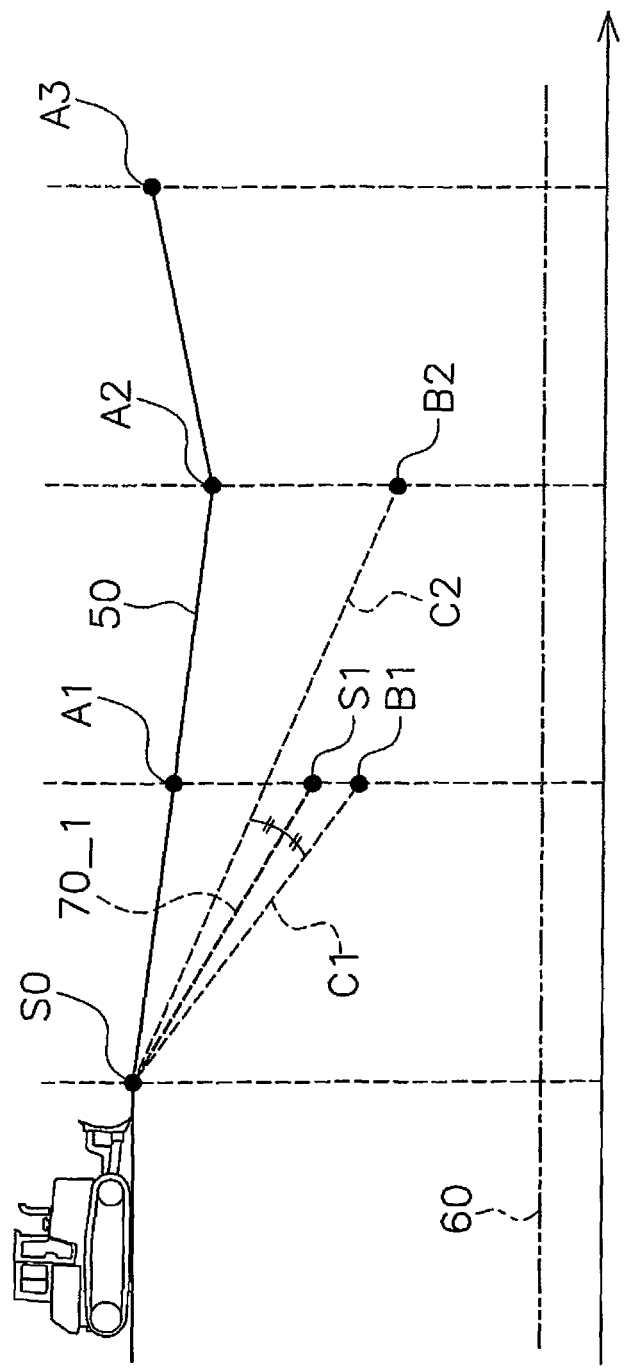
FIG. 10 illustrates a process for determining the target design topography.

In step S207, the controller 26 determines the target design topography 70. The controller 26 determines the target design topography 70 for each division demarcated by the plurality of division points An. As illustrated in FIG. 10, the controller 26 determines a first target design topography 70_1 that passes between the first reference topography C1 and the second reference topography C2. The first target design topography 70_1 is the target design topography 70 between the starting point S0 and the first preceding division point A1.

Specifically, the controller 26 calculates the average angle of the first reference topography C1 and the second reference topography C2. The average angle is the average value between the angle of the first reference topography C1 with respect to the horizontal direction and the angle of the second reference topography C2 with respect to the horizontal direction The controller 26 determines, as the first target design topography 70_1, a straight line that is inclined by the average angle with respect to the horizontal direction.

Figure 11:
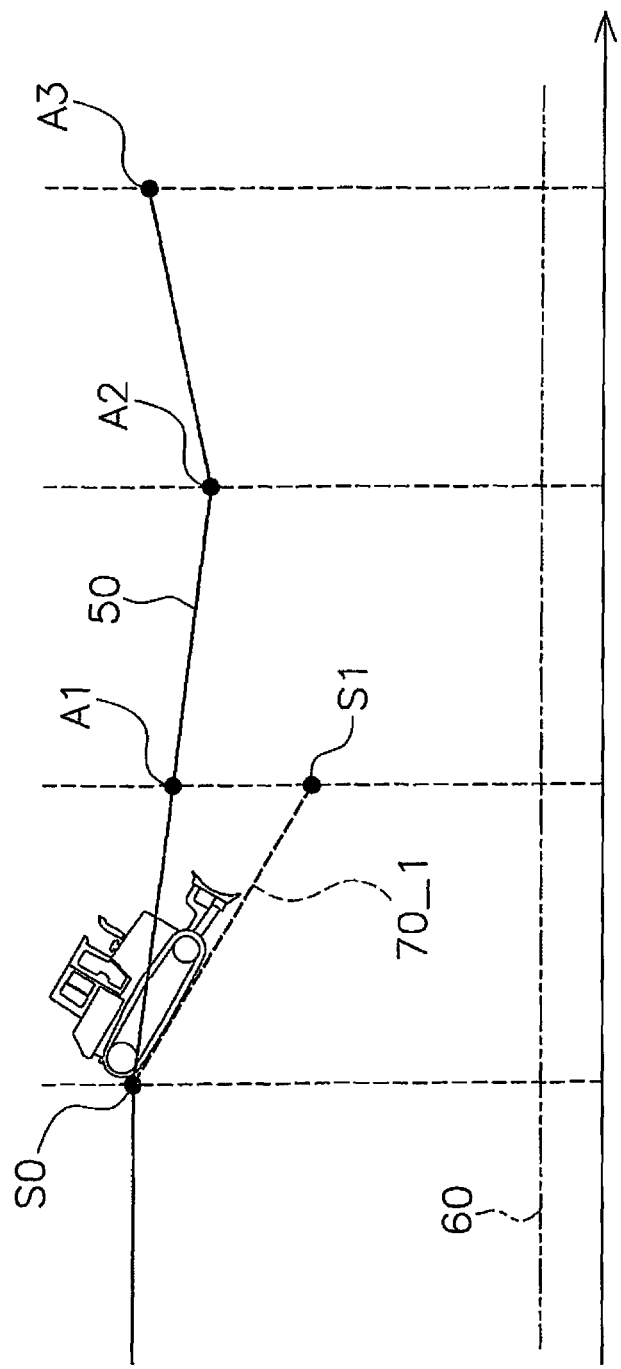
FIG. 11 illustrates a process for determining the target design topography.

When the first target design topography 70_1 is determined as indicated above, the controller 26 controls the work implement 13 in accordance with the first target design topography 70_1 in accordance with the abovementioned process of step S105 as illustrated in FIG. 11.

Figure 12:
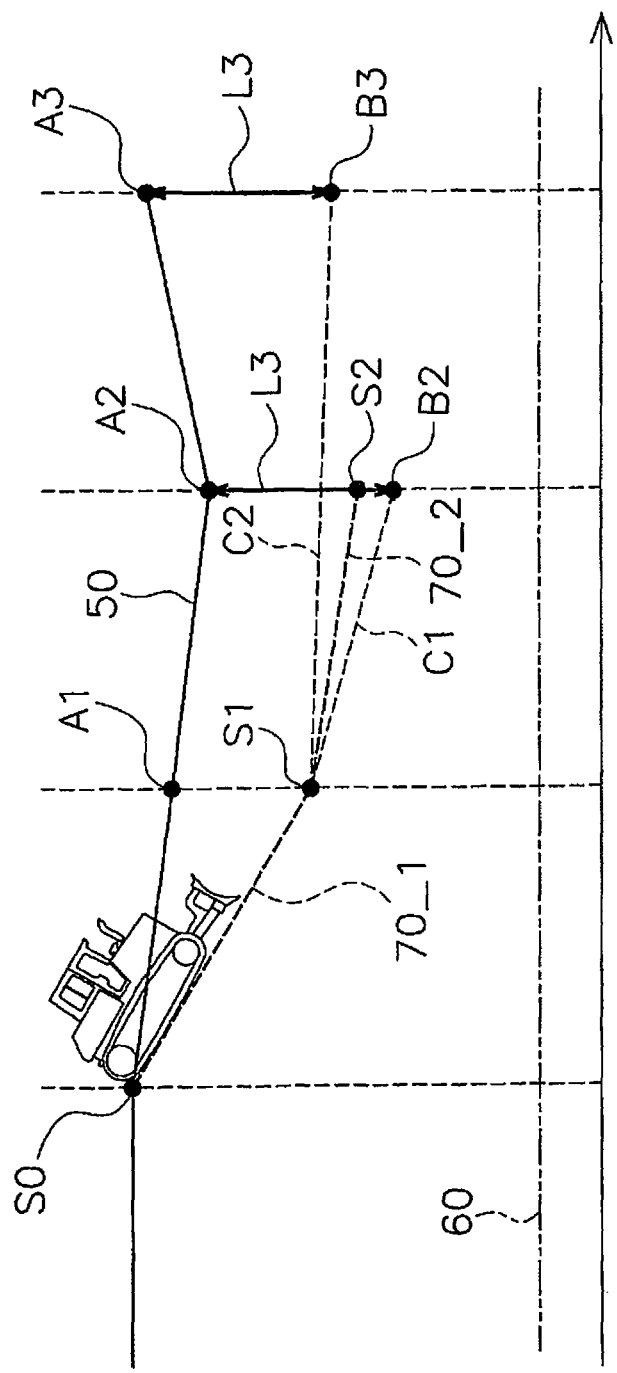
FIG. 12 illustrates a process for determining the target design topography.

In step S208, the controller 26 determines the next starting point S1. The next starting point S1 is the starting point of the next target design topography 70, namely a second target design topography 70_2. As illustrated in FIG. 12, the next starting point S1 is the end position of the first target design topography 70_1 and is positioned directly below the division point A1.

Upon determining the next starting point S1, the controller 26 determines the second target design topography 70_2 by repeating the processes from step S205 to step S207. The controller 26 determines the second target design topography 70_2 while working in accordance with the first target design topography 70_1.

Specifically, as illustrated in FIG. 12, the controller 26 determines, as the next first reference topography C1, a straight line that links the next starting point S1 and the first preceding reference point B2. The controller 26 also determines, as the next second reference topography C2, a straight line that links the next starting point S1 and the second preceding reference point B3. The controller 26 determines the second target design topography 70_2 from the average angle of the first reference topography C1 and the second reference topography C2. The second target design topography 70_2 is the target design topography 70 between the next starting point S1 and the first preceding division point A2.

When the work vehicle 1 reaches the next starting point S1, the controller 26 controls the work implement 13 in accordance with the second target design topography 70_2 in accordance with the abovementioned process of step S105. The controller 26 then continues the excavation of the actual topography 50 by repeating the above processes.

When a predetermined completion condition is satisfied, the controller 26 finishes the abovementioned processes for determining the target design topography 70. The predetermined completion condition is, for example, that the amount of material held by the work implement 13 has reached a predetermined upper limit. When the predetermined completion condition is satisfied, the controller 26 controls the work implement 13 so as to follow the actual topography 50. Consequently, the excavated material can be transported smoothly.

In the control system 3 of the work vehicle 1 according to the present embodiment explained above, the controller 26 operates the work implement 13 in accordance with the target design topography 70. As a result, when the final design topography 60 is still in a deep position, excavating by the work implement 13 is performed in accordance with the target design topography 70 that is positioned above the final design topography 60. As a result, a situation in which the load on the work implement 13 becomes excessive is suppressed. In addition, the sudden raising or lowering of the work implement 13 is suppressed. Accordingly, the work vehicle 1 can be made to perform work efficiently and with a good finish quality.

The controller 26 determines the target design topography 70 that passes between the first reference topography C1 and the second reference topography C2. Therefore, if the actual topography 50 has undulations, the target design topography 70 is determined so as to smooth the undulations. Thereby, excavation can be performed so that the actual topography 50 becomes smooth. Accordingly, work can be performed with a good finish quality.

The controller 26 determines the second target design topography 70_2 while working in accordance with the first target design topography 70_1. As a result, work can be performed with good efficiency.

Although an embodiment of the present invention has been described so far, the present invention is not limited to the above embodiments and various modifications may be made within the scope of the invention.

The work vehicle 1 is not limited to a bulldozer, and may be another type of work vehicle such as a wheel loader, a motor grader, a hydraulic excavator, or the like.

The work vehicle 1 may be a vehicle that can be remotely operated. In this case, a portion of the control system 3 may be disposed outside of the work vehicle 1. For example, the controller 26 may be disposed outside the work vehicle 1. The controller may be disposed inside a control center spaced away from the work site. In this case, the work vehicle 1 may not be provided with the operating cabin 14.

The work vehicle 1 may be driven by an electric motor. In this case, the power source may be disposed outside of the work vehicle 1. The internal combustion engine or the engine compartment may not be provided in the work vehicle 1 in which the power source is supplied from the outside.

Figure 13:
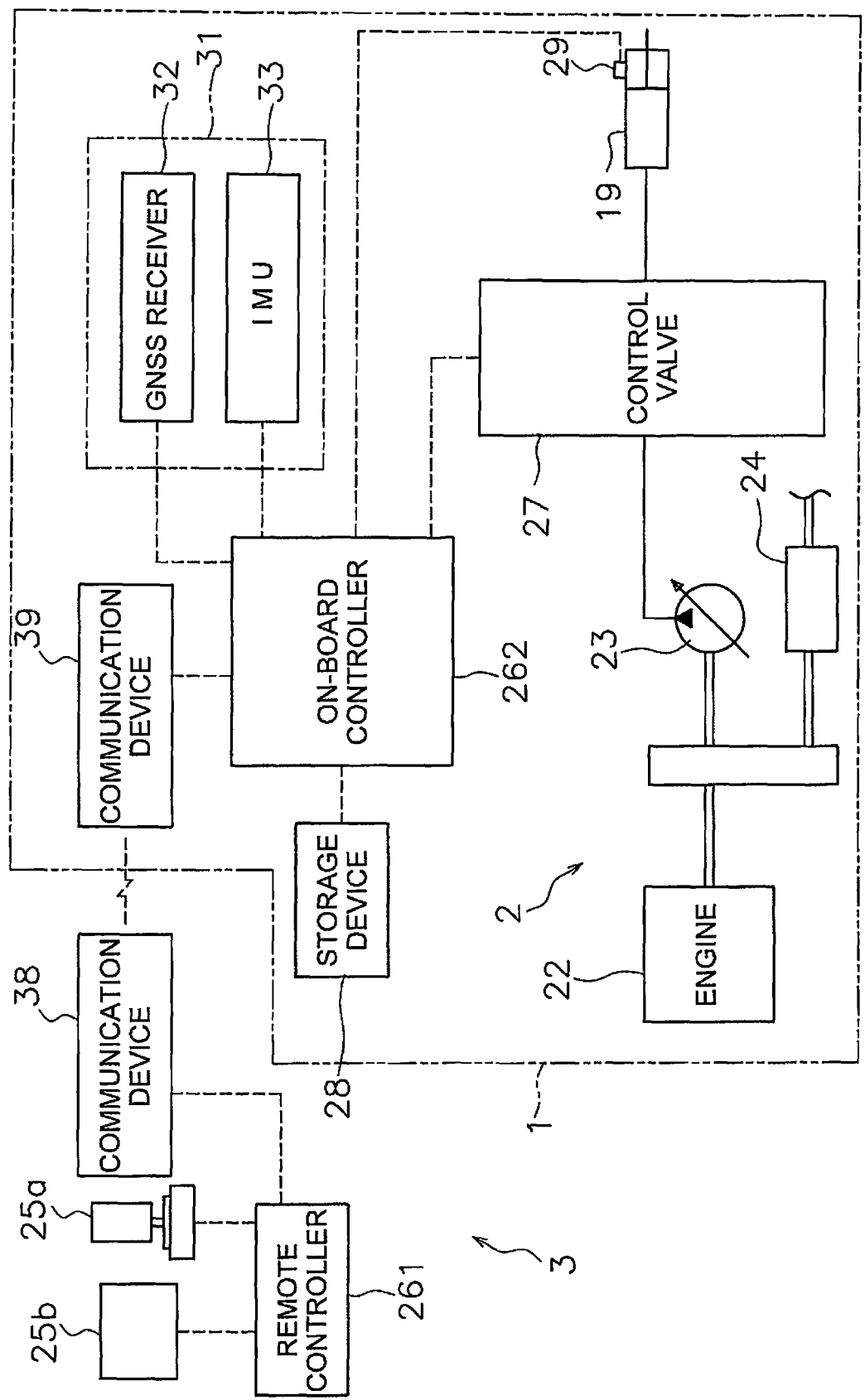
FIG. 13 is a block diagram of a configuration of a drive system and a control system of the work vehicle according to a first modified example.

The controller 26 may have a plurality of controllers 26 separate from each other. For example, as illustrated in FIG. 13, the controller 26 may include a remote controller 261 disposed outside of the work vehicle 1 and an on-board controller 262 mounted in the work vehicle 1. The remote controller 261 and the on-board controller 262 may be able to communicate wirelessly via communication devices 38 and 39. A portion of the abovementioned functions of the controller 26 may be executed by the remote controller 261, and the remaining functions may be executed by the on-board controller 262. For example, the processing for determining the target design topography 70 may be performed by the remote controller 261, and the process for outputting the command signals to the work implement 13 may be performed by the on-board controller 262.

The operating device 25a and the input device 25b may also be disposed outside of the work vehicle 1. In this case, the operating cabin may be omitted from the work vehicle 1. Alternatively, the operating device 25a and the input device 25b may be omitted from the work vehicle 1.

Figure 14:
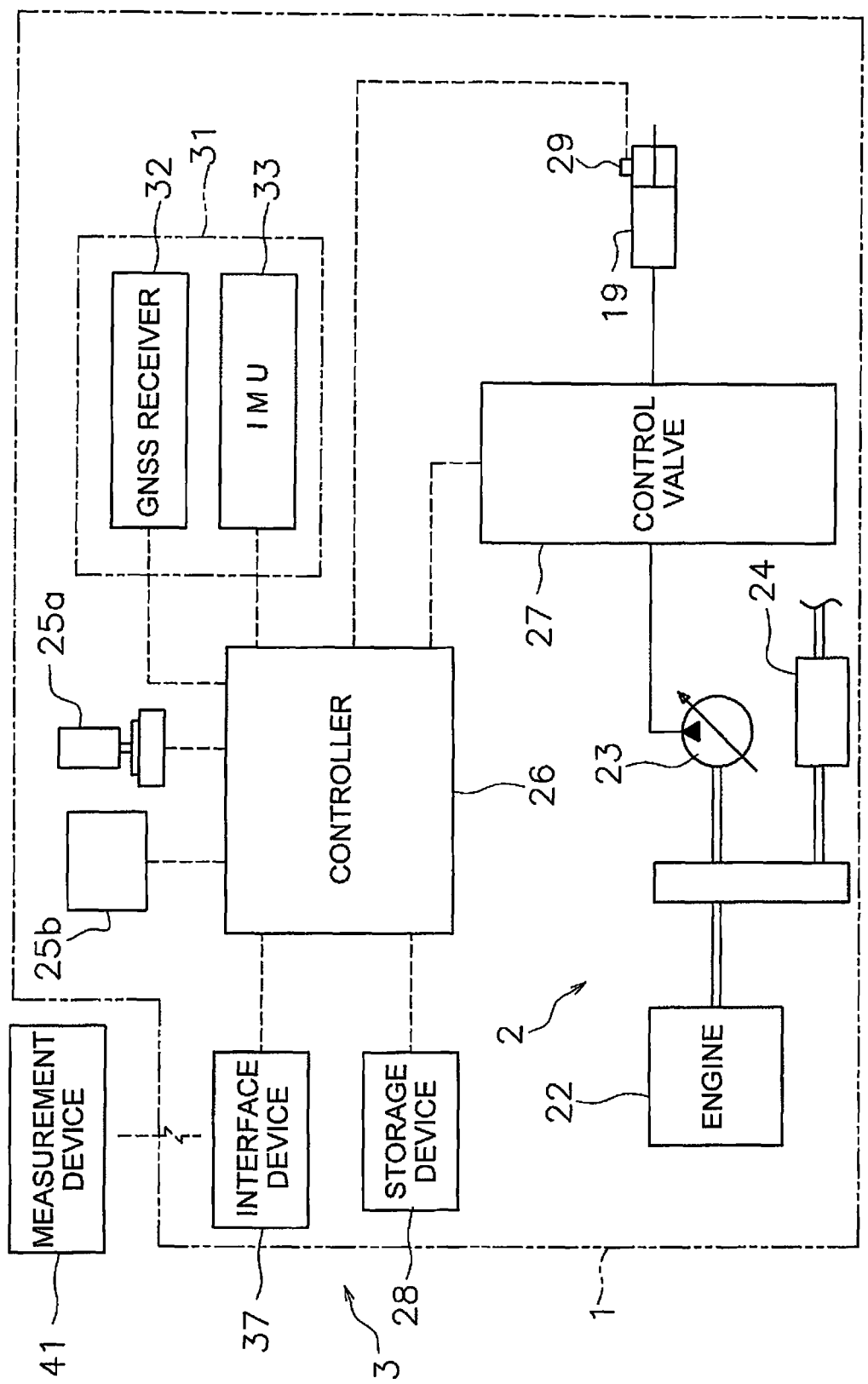
FIG. 14 is a block diagram of a configuration of a drive system and a control system of the work vehicle according to a second modified example.
Figure 15:
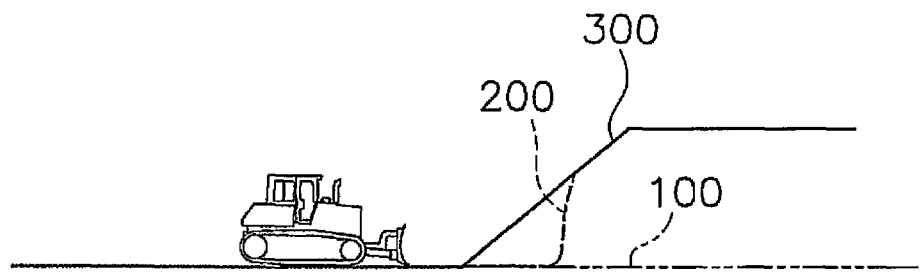
FIG. 15 illustrates excavation work according to the prior art.

The actual topography 50 may be obtained with another device and is not limited to being obtained with the abovementioned positional sensor 31. For example, as illustrated in FIG. 14, the actual topography 50 may be obtained with an interface device 37 that receives data from an external device. The interface device 37 may wirelessly receive the actual topography data measured by an external measurement device 41. Alternatively, the interface device 37 may be a recording medium reading device and may receive the actual topography data measured by the external measurement device 41 via a recording medium.

The method for setting the target design topography 70 is not limited to the method of the above embodiment and may be changed. For example, the target design topography 70 is determined based on two preceding reference points from the starting point in the above embodiment. However, the target design topography 70 may be determined based on three or more preceding reference points from the starting point.

The controller 26 determines the target design topography 70 based on the average angle between the first reference topography C1 and the second reference topography C2 in the above embodiment. However, the determination is not limited to the average angle and the controller 26 may determine the target design topography 70 by implementing a process such as weighting the angle of the first reference topography C1 and the angle of the second reference topography C2.

The controller 26 determines the second target design topography 70_2 during the work on the first target design topography 70_1 and before reaching the next starting position S1 in the above embodiment. However, the controller 26 may determine the second target design topography 70_2 upon reaching the next starting point S1.

According to the present invention, a work vehicle can be made to perform work efficiently and with a good finish quality with automatic control.

The invention claimed is:

1. A control system for a work vehicle including a work implement, the control system comprising:
a controller configured to
obtain actual topography data indicative of an actual topography of a work site,
determine a target depth,
obtain positions of a plurality of division points positioned on the actual topography based on the actual topography data,
determine a plurality of reference points by displacing the plurality of division points in a vertical direction by the target depth,
determine a target design topography based on the plurality of reference points, and
generate a command signal to operate the work implement in accordance with the target design topography.

2. The control system for a work vehicle according to claim 1, wherein
the controller is further configured to
determine a starting point, and
determine the target design topography between the starting point and a first preceding division point based on a first preceding reference point and a second preceding reference point from the starting point.

3. The control system for a work vehicle according to claim 2, wherein
the controller is further configured to
determine a first reference topography and a second reference topography, the first reference topography being indicative of a straight line that links the starting point and the first preceding reference point, the second reference topography being indicative of a straight line that links the starting point and the second preceding reference point, and
determine the target design topography between the starting point and the first preceding division point so that the target design topography passes between the first reference topography and the second reference topography.

4. The control system for a work vehicle according to claim 3, wherein
the controller is further configured to
determine an average angle of the first reference topography and the second reference topography, and
determine the target design topography between the starting point and the first preceding division point based on the average angle.

5. The control system for a work vehicle according to claim 1, wherein
the controller is further configured to
determine a next starting point, and
determine a next target design topography based on the first preceding reference point and the second preceding reference point from the next starting point.

6. A method executed by a controller for controlling a work vehicle including a work implement, the method comprising:
obtaining actual topography data indicative of an actual topography of a work site;
determining a target depth;
obtaining positions of a plurality of division points positioned on the actual topography based on the actual topography data;
determining a plurality of reference points by displacing the plurality of division points in a vertical direction by the target depth;
determining a target design topography based on the plurality of reference points; and
generating a command signal to operate the work implement in accordance with the target design topography.

7. The method according to claim 6, further comprising:
determining a starting point,
the determining the target design topography including determining the target design topography between the starting point and a first preceding division point based on a first preceding reference point and a second preceding reference point from the starting point.

8. The method according to claim 7, further comprising:
determining a first reference topography and a second reference topography, the first reference topography being indicative of a straight line that links the starting point and the first preceding reference point, the second reference topography being indicative of a straight line that links the starting point and the second preceding reference point,
the determining the target design topography including determining the target design topography between the starting point and the first preceding division point so that the target design topography passes between the first reference topography and the second reference topography.

9. The method according to claim 8, further comprising:
determining an average angle of the first reference topography and the second reference topography,
the determining the target design topography including determining the target design topography between the starting point and the first preceding division point based on the average angle.

10. The method according to claim 6 further comprising:
determining a next starting point,
the determining the target design topography including determining a next target design topography based on the first preceding reference point and the second preceding reference point from the next starting point.

11. A work vehicle comprising:
a work implement; and
a controller that controls the work implement, the controller being configured to
obtain actual topography data indicative of an actual topography of a work site,
determine a target depth,
obtain positions of a plurality of division points positioned on the actual topography based on the actual topography data, determine a plurality of reference points by displacing the plurality of division points in a vertical direction by the target depth, determine a target design topography based on the plurality of reference points, and generate a command signal to operate the work implement in accordance with the target design topography.

12. The work vehicle according to claim 11, wherein the controller is further configured to determine a starting point, and determine the target design topography between the starting point and a first preceding division point based on a first preceding reference point and a second preceding reference point from the starting point.

13. The work vehicle according to claim 12, wherein the controller is further configured to determine a first reference topography and a second reference topography, the first reference topography being indicative of a straight line that links the starting point and the first preceding reference point, the second reference topography being indicative of a straight line that links the starting point and the second preceding reference point, and determine the target design topography between the starting point and the first preceding division point so that the target design topography passes between the first reference topography and the second reference topography.

14. The work vehicle according to claim 13, wherein the controller is further configured to determine an average angle of the first reference topography and the second reference topography, and determine the target design topography between the starting point and the first preceding division point based on the average angle.

15. The work vehicle according to claim 11, wherein the controller is further configured to determine a next starting point, and determine a next target design topography based on the first preceding reference point and the second preceding reference point from the next starting point.

\* \* \* \* \*